United States Patent [19]

Matsumoto

[11] 4,164,755
[45] Aug. 14, 1979

[54] VIDEO DISC PICKUP APPARATUS

[75] Inventor: Yasushi Matsumoto, Narashino, Japan

[73] Assignee: RCA Corporation, New York, N.Y.

[21] Appl. No.: 830,029

[22] Filed: Sep. 2, 1977

[30] Foreign Application Priority Data

Sep. 13, 1976 [GB] United Kingdom ............... 37852/76

[51] Int. Cl.$^2$ ............................................. H04N 5/76
[52] U.S. Cl. .......................... 358/128; 179/100.41 G; 274/38; 179/100.1 B
[58] Field of Search ............. 179/100.41 G, 100.41 P, 179/100.41 R, 100.1 B; 358/128; 274/38, 37

[56] References Cited

U.S. PATENT DOCUMENTS

| | | | |
|---|---|---|---|
| 1,966,873 | 7/1934 | Sochor | 274/38 |
| 2,544,495 | 3/1951 | Franz | 274/38 |
| 2,572,426 | 10/1951 | Andrews | 179/100.41 R |
| 3,774,918 | 11/1973 | Shibata | 274/38 |
| 3,842,194 | 10/1974 | Clemens | 358/128 |
| 3,943,276 | 3/1976 | Knitter | 358/128 |
| 4,031,546 | 6/1977 | Leedom | 358/128 |

*Primary Examiner*—Bernard Konick
*Assistant Examiner*—Alan Faber
*Attorney, Agent, or Firm*—Eugene M. Whitacre; William H. Meagher; Dilip A. Kulkarni

[57] ABSTRACT

A novel pickup stylus includes a tapered diamond support element having a plurality of conical portions in the region of its tip, which conical portions have a common axis. Two of the conical portions are separated by an electrode bearing surface. The angle of inclination of the electrode bearing surface with the stylus axis is not less than the angle included between the conical portions and the stylus axis. A record engaging surface is provided in the tip region substantially orthogonal to the electrode bearing surface such that the two surfaces intersect each other along a line substantially perpendicular to the stylus axis. The perpendicular line forms the base of a stylus footprint disposed in the plane of the record engaging surface. The diamond support element includes a pair of converging flat surfaces in the tip region which are disposed such that the intersection of the converging flat surfaces with the record engaging surface defines the side edges of the stylus footprint and the intersection of the converging flat surfaces with a conical portion remote from the electrode bearing surface forms a prow of the diamond support element. The electrode bearing surface of the diamond support element is covered with a metallic layer to form a stylus electrode. The stylus is mounted such that during playback, the stylus axis is disposed at an angle to the record surface, and such that, during playback, the motion of the record is from the stylus support element toward the stylus electrode.

12 Claims, 14 Drawing Figures

VIDEO DISC PICKUP APPARATUS

The present invention relates to a novel system suitable for playback of high density information records, such as video discs, and to a novel diamond stylus advantageous for use in such playback systems.

In U.S. Pat. No. 3,842,194 issued on Oct. 15, 1974 to Jon K. Clemens, a video playback system of a variable capacitance form is disclosed. In one configuration of the Clemens system, information, representative of recorded picture and sound, is encoded in a relatively fine spiral groove on the surface of a disc record (e.g., groove width—3.5 micrometers, groove depth—1.0 micrometer). The record substrate is covered with a coating of conductive material and a dielectric layer overlying the conductive coating. During playback, a pickup stylus, having a thin conductive electrode (e.g., 0.1250 micrometers deep), engages the groove as the record is rotated by a supportive turntable. Capacitive variations exhibited between the stylus electrode and the conductive coating are sensed to recover the prerecorded information.

In an illustrative form of stylus for practicing the Clemens invention, the stylus comprises a support element formed of sapphire with a shaped tip defined by a prow, V-shaped electrode bearing rear surface remote from the prow, a record engaging surface extending from the bottom edge of the rear surface and a pair of side surfaces extending from the side edges of the rear surface and converging at the prow. The intersection of the rear and the side surfaces with the record engaging surface forms, for example, a triangular footprint. Illustratively, the angle included between the side edges is equal to 50°, the length of the bottom edge is about 2.5 micrometers, the height of the triangular footprint is about 4.6 micrometers and the angle between the prow and the rear surface is about 50° to 65°. The rear surface of the sapphire support element is coated with a thin layer of conductive material (for example, about 0.1250 micrometers deep) to form a stylus electrode.

The use of diamond in place of sapphire for the support element of the stylus can be expected to increase the life of the stylus. However, the processing of a diamond stylus to provide the desired stylus structure is attended with difficulties owing to the shape requirements of the tip, tiny physical dimensions and high hardness of the diamond.

A new stylus shape has been conceived which not only possesses the desirable stylus structure, but is also adapted for mass production of low cost and long life video disc playback styli made from diamond.

Pursuant to the principles of the present invention, a novel diamond stylus element has a tapered end which terminates into a tip. The tip region of the novel stylus element comprises a plurality of conical portions having a common axis. Two of the conical portions are separated by a first substantially flat surface which is disposed such that the angle included between the first flat surface and the stylus axis is not less than the angle subtended by the conical surfaces and the stylus axis. A record engaging surface is disposed in the tip region substantially orthogonal to the first flat surface such that the two surfaces intersect each other along a line substantially perpendicular to the stylus axis. The perpendicular line forms the base of a stylus footprint disposed in the plane of the record engaging surface.

In accordance with a still further feature of the invention, the diamond support element includes a pair of converging flat surfaces in the tip region which are disposed such that the intersection of the converging flat surfaces with the record engaging surface defines the side edges of the stylus footprint and the intersection of the converging flat surfaces with a conical portion remote from the first flat surface forms a prow of the diamond support element.

In order to form a stylus electrode for use in a capacitance type playback system (for example, the Clemens system, the first substantially flat surface may be coated with a thin layer of conductive material.

Pursuant to still another feature of the invention, the stylus is mounted such that, during playback, the stylus axis is disposed at an angle with the record surface and such that, during playback, the motion of the record is from the stylus support element toward the stylus electrode.

A convenient stylus manufacturing method, applicable to novel diamond stylus formation, is described subsequently.

Figure 8:
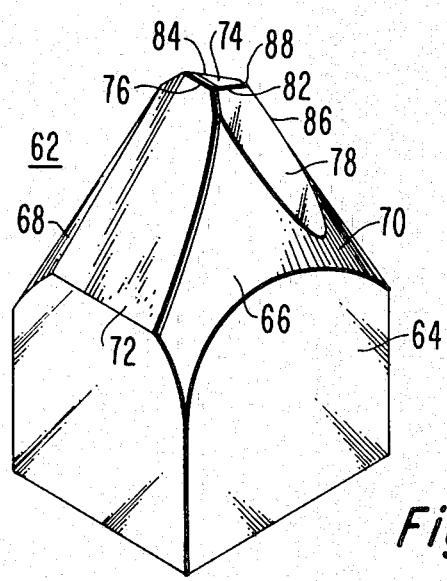

FIG. 8 shows the tip region of the novel pickup stylus of FIGS. 1, 2 and 4–7 in perspective; and FIGS. 9–11 and 9(a)–11(a) illustrate the sequence involved in shaping a square post shaped diamond support element to form a novel stylus of FIGS. 1, 2 and 4–8.

Figure 1:
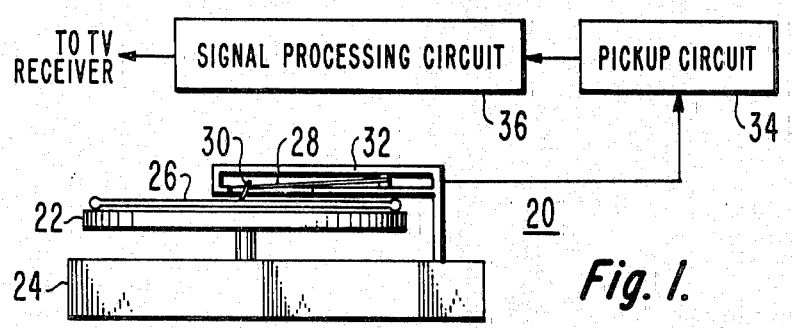
FIG. 1 illustrates a video disc system for playing back prerecorded signals recorded in a disc record track of a given width in which a novel pickup stylus constructed in accordance with the present invention may be advantageously employed.
Figure 2:
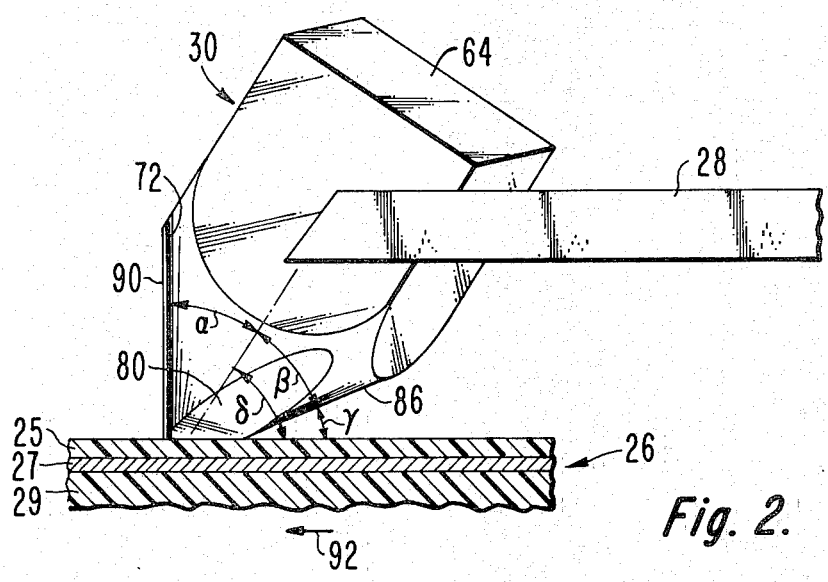
FIG. 2 represents a portion of the video disc system of FIG. 1 perspectively showing, in a greatly exaggerated form, the novel pickup stylus, secured to stylus arm, riding in the disc record track.
Figure 4:
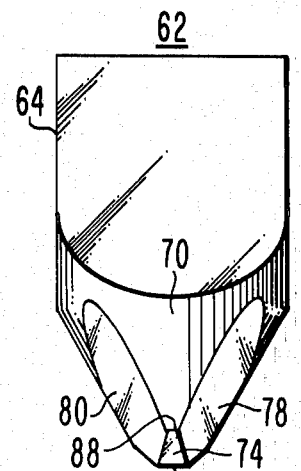
FIGS. 4, 5, 6 and 7 illustrate, respectively, the rear view, the end view, the front view and the bottom view of the novel pickup stylus of FIGS. 1 and 2.
Figure 5:
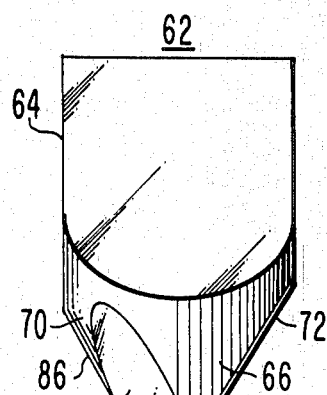
Figure 6:
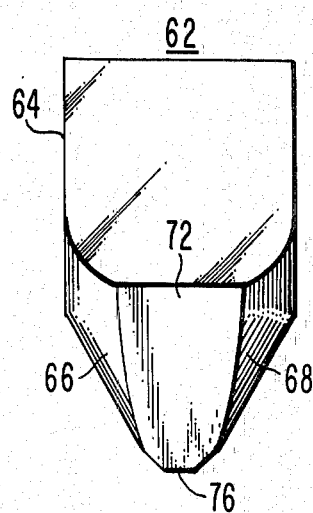
Figure 7:
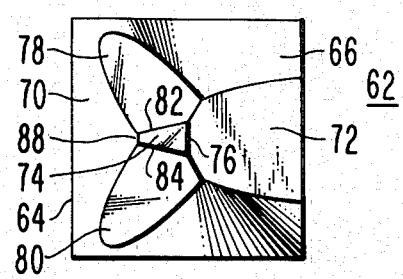

Referring to FIG. 1, there is shown a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm. The turntable 22 supports and centers a video disc 26 having information, representative of picture and sound, recorded along a spiral groove disposed on the surface thereof. To obtain adequate playback time, the groove convolutions on the video disc 26 are relatively closely spaced (e.g., groove pitch—3.5 micrometers). As shown in FIG. 2, the video disc 26 has a dielectric deposit 25 overlying a conductive coating 27 on the video disc substrate 29.

As shown more clearly in FIG. 2, a stylus arm 28 carries at the free end thereof, a groove-engaging pickup stylus 30 which has a novel structure pursuant to the principles of the present invention. The stylus arm 28 is pivotally supported at its remote end to a carriage 32 as shown in FIG. 1. The stylus arm pivot may be of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system may be of the type shown in U.S. Pat. No. 3,870,835 issued to F. R. Stave.

As previously indicated, the pickup stylus 30 incorporates a relatively thin electrode (e.g., 0.1250 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit may be of the type illustrated in U.S. Pat. Appln. Ser. No. 743,144, filed Nov. 18, 1976 of H. Kawamoto, et al, now U.S. Pat. No. 4,080,625. The signal processing circuit 36 may be of the type illustrated in U.S. Pat. No. 3,969,757 issued to J. Amery.

Figure 3:
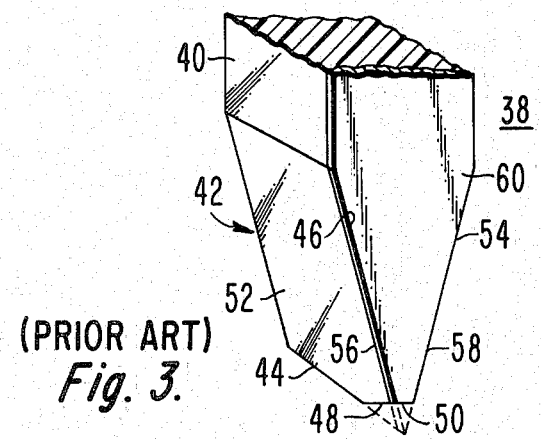
FIG. 3 shows a perspective view of a prior art stylus having a V-shaped tip.

FIG. 3 shows a prior art pickup stylus having a V-shaped tip. The V-tipped pickup stylus 38 includes a sapphire support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectively, from the side edges 56 and 58 of the rear surface and intersecting at the prow. The intersection of the rear surface 46 and the side surfaces 52 and 54 with the bottom surface 48 defines, for example, a triangular stylus footprint. The entire rear surface 46 of the sapphire support element 40 is coated with conductive material to form a stylus electrode 60.

The use of diamond in place of sapphire for the support element of the video disc player stylus can be expected to increase the life of the stylus. However, the processing of a diamond stylus to obtain desired stylus shape is attended with difficulties due to the shape requirements of the tip, tiny physical dimensions and high hardness of the diamond.

A new system has been conceived, which results in a novel and advantageous stylus shape, and provides a convenient stylus manufacturing method applicable to diamond stylus fabrication.

The novel structure for the diamond stylus will be explained with reference to FIGS. 4–8. FIG. 8 is the perspective view of the new diamond stylus. FIGS. 4–7 are, respectively, the rear view, the end view, the front view and the bottom view of the new diamond stylus.

As shown in these FIGURES, the novel diamond support element 62 has a square post shank 64 which tapers at its one end into a tip. The diamond support element 62 has a plurality of conical portions 66, 68 and 70 in the tip region which have a common axis. The angle subtended by the generating line of the conical portions with the stylus axis is approximately 27.5° in the illustrated embodiment.

Two of the conical portions 66 and 68 are separated by an electrode bearing surface 72. In this particular embodiment, the angle subtended by the electrode bearing surface 72, with the stylus axis is about 37.5°. It is desired that the angle subtended by the electrode bearing surface with the stylus axis be not less than the angle included between the conical surfaces and the stylus axis.

The diamond stylus has in its tip region a record engaging surface 74 which is disposed substantially orthogonal to the electrode bearing surface 72 such that the two surfaces intersect each other along a line 76 perpendicular to the stylus axis. The perpendicular line 76 forms the base of a stylus footprint.

A pair of converging flat surfaces 78 and 80 are provided in the tip region such that the converging flat surfaces intersect with the record engaging surface 74 to define the side edges 82 and 84 of the stylus footprint and such that the intersection of the converging flat surfaces with the conical portion 70 forms a prow 86 remote from the electrode bearing surface 72. The intersection of the prow 86 with the record engaging surface 74 defines the apex 88 of the stylus footprint.

In this particular embodiment, the angle included between the converging flat surfaces 78 and 80 is about 60° and the angle subtended by the converging flat surfaces with the stylus axis is approximately 37.5°. The location of the various surfaces relative to the stylus axis is such that the base dimension of the stylus footprint is 2.5 micrometers and the length of the side edges of the stylus footprint is in the 6–8 micrometer range.

In video disc playback systems wherein recorded information is sensed as variations in capacitance exhibited between a stylus electrode and a conductive coating overlying geometric variations in the disc's groove bottom (for example, the aforesaid Clemens system), a thin layer of conductive material (e.g., 0.1250 micrometers deep) may be deposited on the rear surface 72 of the diamond support element to form a stylus electrode 90, as shown in FIG. 2. The deposition may be made by any known method, such a vacuum evaporation or sputtering.

In accordance with another feature of the invention, the novel diamond stylus is mounted on the stylus arm such that the stylus axis is inclined at an angle of about 52.5° to the record surface (this angle is denoted by the letter δ in FIG. 2). This stylus mounting is in contrast with the conventional stylus mounting where the stylus axis is disposed orthogonal to the record surface. With this inclination of the stylus axis, the stylus electrode 90 is disposed substantially perpendicular to the record surface, since the angle α is 37.5° in this embodiment. With this arrangement, the angle subtended by the prow 86 with the record surface is about 25° (this angle is indicated by the letter γ), because the angle β is made 27.5°. FIG. 2 additionally shows the location of the stylus electrode 90 in relation to the motion of the record 26 which is indicated by the arrow 92.

For proper tracking of the stylus in the video disc groove during playback, it is desirable that the stylus prow angle, indicated by the letter γ in FIG. 2, lie in the 25 to 35 degree range. Pursuant to the present invention, the stylus prow angle depends on the cone angle and is independent of the disposition of the two converging flat surfaces. This is advantageous because it is rather difficult to obtain precise relative disposition of the two converging flat surfaces.

One of the advantages of the tilted stylus mounting is that, during playback, it is relatively easy for the stylus to ride over a bump in the record groove, whereby the stylus chipping is reduced and the stylus life is increased. If a perpendicularly mounted stylus hits a bump in the record groove during playback, it tends to dig into the record resulting in higher instantaneous local pressures in the stylus tip region which cause stylus damage.

Another advantage of the tilted stylus is that relatively large debris within the record groove, which would tend to accumulate on a perpendicularly mounted stylus, tends to be passed along the length of the tilted stylus and carried away by the moving record.

Furthermore, the stylus force acts on the record by being divided into the vertical and horizontal components owing to the inclination of the stylus with the record surface. The stylus mounting is such that the stylus tip is always pushed in the direction of the record motion during playback. The tilted stylus arrangement is advantageous as compared with the perpendicular stylus arrangement because for a given stylus force, there is less vertical force and experiments have shown that the tilted stylus runs smoother in the record groove during playback.

Figure 9:
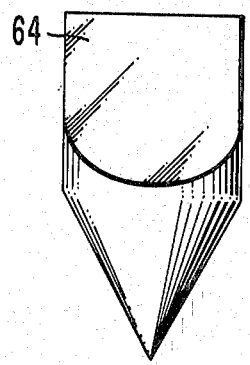
Figure 9A:
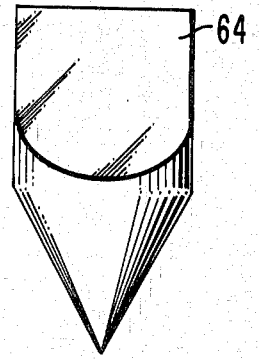
Figure 10:
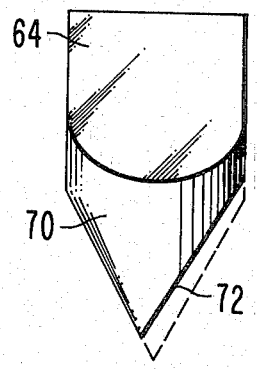
Figure 11:
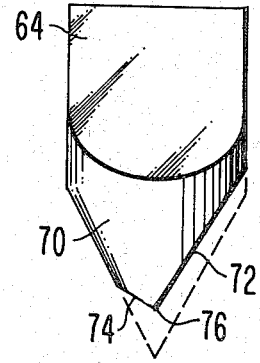

The novel manufacturing method for forming novel diamond stylus will now be described in conjunction with FIGS. 9–11 and 9(a) to 11(a). FIGS. 9–11 show the end views and FIGS. 9(a) to 11(a) show the front views of the diamond support element as it undergoes transformation starting with a square shaped diamond post. The final shape of the novel diamond stylus is shown in FIGS. 4–8.

In the new system, the square post shaped diamond is fixed to a metallic shank under conditions where the axis of the square post is inclined at an angle of approximately 27.5° to the grinding surface, and the diamond, which is being rotated, is ground to form a conical surface on its tip part just as a writing pencil is sharpened. The resulting stylus structure is shown in FIGS. 9 and 9(a).

Figure 10A:
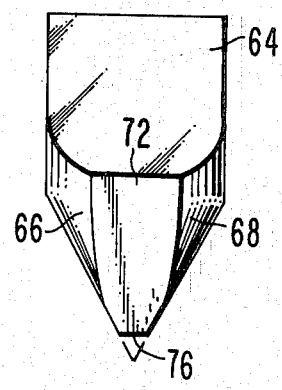

The diamond, with a conical shaped tip, is then held in a fixed position such that a preferred crystal-face can be obtained, and is ground to form an electrode bearing surface 72 such that is subtends an angle of 37.5° with the stylus. The resulting stylus structure is shown in FIGS. 10 and 10(a). Alternately, the electrode bearing surface 72 may be formed such that it is parallel to the generating line of the conical surface.

Figure 11A:
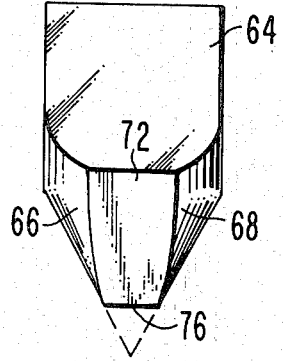

The diamond, with the electrode bearing surface, is then ground crosswise at a right angle to the electrode bearing surface, whereby a horse-shoe-shaped record engaging surface is formed on the bottom of the diamond tip. The resulting stylus structure is shown in FIGS. 11 and 11(a).

Then the diamond tip is ground to form the converging flat surfaces 78 and 80. The resulting stylus structure is shown in FIGS. 4–8.

By the processing system described above, the tip part of the square post shaped diamond is changed to the conical shape with a record engaging surface at its pointed end. After that, the three sides of the record engaging surface are finished so that the short-side length is approximately 2.5 micrometers to meet the width of the grooves of the video disc, and the long-side length is in the 6–8 micrometer range. The sequence of the above-described steps may be altered without departing from the scope of the invention.

Lastly, after the diamond support element is precisely finished, a metallic coating is deposited by means of vacuum evaporation or sputtering on the electrode bearing surface. Alternatively, the metallic coating may be deposited on the electrode bearing surface immediately after it is formed.

As the above-described process can be performed relatively quickly, the new diamond styli can be manufactured at relatively low cost.

The convenient diamond stylus manufacturing method, applicable to novel diamond stylus formation, is the subject matter of the concurrently filed U.S. patent application Ser. No. 830,028 of Y. Matsumoto entitled, "METHOD FOR MANUFACTURING A DIAMOND STYLUS FOR VIDEO DISC PLAYERS."

What is claimed is:

1. A pickup stylus for playing back prerecorded signals from a disc record track of a given width when stylus/record relative motion is established; said pickup stylus comprising:
   a tapered stylus element having a plurality of conical portions in the region of its tip; said conical portions having a common axis;
   wherein two of said conical portions are separated by a substantially flat, non-record-engaging surface; wherein the angle subtended by said non-record-engaging surface with said axis is less than ninety degrees;
   wherein a substantially flat, record-engaging surface is disposed in the region of its tip substantially orthogonal to said non-record-engaging surface such that said surfaces intersect each other along a line substantially perpendicular to said axis and forming the base edge of said record-engaging surface; the dimension of said base edge being less than said given track width.

2. A stylus as defined in claim 1 wherein said stylus element is made from diamond material.

3. A stylus as defined in claim 1 further including a layer of conductive material adherent to said non-record-engaging surface to form a stylus electrode.

4. A stylus as defined in claim 1 wherein the angle subtended by said conical portions with said axis is about 27.5°; wherein the angle included between said non-record-engaging surface and said axis is approximately 37.5°; and wherein said record-engaging surface is disposed at about 90° with respect to said non-record-engaging surface.

5. A stylus as defined in claim 1 wherein a portion of said stylus element remote from said stylus tip has a square cross-section; wherein said base edge of said record-engaging surface is disposed parallel to a pair of opposing parallel surfaces of said square cross-section portion of said stylus element.

6. A stylus as defined in claim 1 further having a pair of substantially flat, converging surfaces in the region of said stylus tip such that the intersection of said converging surfaces with said record-engaging surface defines the side edges of said record-engaging surface.

7. A stylus as defined in claim 1 wherein said record-engaging surface is triangular; said stylus further having a pair of substantially flat, converging surfaces in the region of said stylus tip such that the intersection of said converging surfaces with said record-engaging surface defines the side edges of said triangular record-engaging surface and the intersection of said converging surfaces with a conical portion disposed remote from said non-record-engaging surface defines the apex of said triangular record-engaging surface.

8. A stylus as defined in claim 7 wherein said stylus element is made from diamond material.

9. A stylus as defined in claim 7 wherein said stylus further includes a layer of conductive material adherent to said non-record-engaging surface to form a stylus electrode.

10. A stylus as defined in claim 7 wherein the angle subtended by said conical portions with said axis is about 27.5°; wherein the angle included between said non-record-engaging surface and said axis is approximately 37.5°; and wherein said record-engaging surface is disposed at about 90° relative to said non-record-engaging surface.

11. A stylus as defined in claim 7 wherein a portion of said stylus element remote from said stylus tip has a square cross-section; wherein said base edge of said record-engaging surface is disposed parallel to a pair of opposing parallel surfaces of said square cross-section portion of said stylus element.

12. A stylus as defined in claim 7 suitable for use with a playback apparatus including a turntable for rotatably supporting a record during playback and a stylus arm; wherein said stylus is secured to said stylus arm such that said record-engaging surface is disposed in engagement with said record track during playback and said base edge is disposed perpendicularly with respect to said record track.

* * * * *